(12) United States Patent
Mizuno et al.

(10) Patent No.: US 9,461,306 B2
(45) Date of Patent: Oct. 4, 2016

(54) VANADIUM OXIDE BASED AMORPHOUS CATHODE MATERIALS FOR RECHARGEABLE MAGNESIUM BATTERY

(71) Applicant: Toyota Motor Engineering & Manufacturing North America, Inc., Erlanger, KY (US)

(72) Inventors: Fuminori Mizuno, Ann Arbor, MI (US); Ruigang Zhang, Ann Arbor, MI (US); Jason Germain, Davis, CA (US); Keiko Kato, Urbana, IL (US); Timothy Sean Arthur, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 395 days.

(21) Appl. No.: 14/078,635

(22) Filed: Nov. 13, 2013

(65) Prior Publication Data

US 2015/0132650 A1    May 14, 2015

(51) Int. Cl.
*H01M 4/485*    (2010.01)
*H01M 4/46*    (2006.01)
*H01M 4/36*    (2006.01)
*H01M 4/58*    (2010.01)
*H01M 10/054*    (2010.01)

(52) U.S. Cl.
CPC ............. *H01M 4/485* (2013.01); *H01M 4/364* (2013.01); *H01M 4/466* (2013.01); *H01M 4/582* (2013.01); *H01M 4/5825* (2013.01); *H01M 10/054* (2013.01); *Y02E 60/122* (2013.01); *Y02P 70/54* (2015.11)

(58) Field of Classification Search
CPC .......................... H01M 4/466; H01M 10/054
USPC ........................................................ 429/219
See application file for complete search history.

(56) References Cited

U.S. PATENT DOCUMENTS

| 4,675,260 A | 6/1987 | Sakurai et al. |
| 4,737,424 A | 4/1988 | Tobishima et al. |
| 5,273,848 A | 12/1993 | Noguchi et al. |
| 2005/0079418 A1 | 4/2005 | Kelley et al. |
| 2009/0291365 A1 | 11/2009 | Iacovangelo et al. |
| 2009/0325039 A1 | 12/2009 | Tsujiko |
| 2011/0070500 A1 | 3/2011 | Chen et al. |
| 2012/0164537 A1 | 6/2012 | Aoyagi et al. |

FOREIGN PATENT DOCUMENTS

| KR | 20010056694 | 7/2001 |
| WO | WO 2011/150093 A1 | 12/2011 |

OTHER PUBLICATIONS

Daichi Imamura, et al., "Mg Intercalation Properties into $V_2O_5$ gel/Carbon Composites under High-Rate Condition" Journal of the Electrochemical Society, 150 (6) A753-A758 (2003).

Daichi Imamura, et al., "Characterization of Magnesium-Intercalated $V_2O_5$/ Carbon Composites" Solid State Ionics 161 (2003) 173-180.

G. G. Amatucci, et al., "Investigation of Yttrium and Polyvalent Ion Intercalation into Nanocrystalline Vanadium Oxide" Journal of the Electrochemical Society, 148 (8) A940-A950 (2001).

E. Levi, et al., "On the Way to Rechargeable Mg Batteries: The Challenge of New Cathode Materials" Chem. Mater., vol. 22, No. 3 (2010) (pp. 860-868).

*Primary Examiner* — Basia Ridley
*Assistant Examiner* — James Erwin
(74) *Attorney, Agent, or Firm* — Oblon, McClelland, Maier & Neustadt, L.L.P

(57) ABSTRACT

A magnesium electrochemical cell having a positive electrode containing as an active ingredient, an amorphous material of formula $[V_2O_5]_c[MgX_y]_d[M_aO_b]_e$ is provided. In the formula M is an element selected from the group consisting of P, B, Si, Ge and Mo, and X is O, F, Cl, Br or I.

20 Claims, 17 Drawing Sheets

VANADIUM OXIDE BASED AMORPHOUS CATHODE MATERIALS FOR RECHARGEABLE MAGNESIUM BATTERY

BACKGROUND OF THE INVENTION

The present invention is directed to a positive electrode active material for a magnesium secondary battery and a magnesium battery with a cathode based on the active material.

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Magnesium as a multivalent ion is an attractive alternate electrode material to lithium, which can potentially provide very high volumetric energy density. It has a highly negative standard potential of −2.375V vs. RHE, a low equivalent weight of 12.15 g/eq and a high melting point of 649° C. Compared to lithium, it is easy to handle, machine and dispose. Because of its greater relative abundance, it is lower in cost as a raw material than lithium and magnesium compounds are generally of lower toxicity than lithium compounds. All of these properties coupled with magnesium's reduced sensitivity to air and moisture compared to lithium, combine to make magnesium an attractive alternative to lithium as an anode material.

Production of a battery having an anode based on magnesium requires a cathode which can reversibly adsorb and desorb magnesium ions and an electrolyte system which will efficiently transport magnesium ions. Significant effort in each of these areas is ongoing in many research organizations throughout the world and active materials under investigation include sulfur in various forms, including elemental sulfur, materials known as Chevrel compounds of formula $Mg_xMo_6T_n$, (wherein x is a number from 0 to 4, T is sulfur, selenium or tellurium, and n is 8) and various metal oxides such as $MnO_2$ (alpha manganese dioxide stabilized by potassium), $V_2O_5$ and ion stabilized oxide or hollandiates of manganese, titanium or vanadium.

In this regard, $V_2O_5$ is an extremely promising candidate for the Mg battery cathode, because it is capable of multiple redox reactions between $V^{5+}/V^{4+}/V^{3+}$ and V metal. Also, $V^{5+}$ as a high valence state is quite stable, which means that it is easy to increase the operating voltage. Various research groups have reported efforts directed to utility of $V_2O_5$ as a positive electrode active material.

Sakurai et al. (U.S. Pat. No. 4,675,260) describes an amorphous $V_2O_5$ prepared by adding at least one first additive selected from the group $P_2O_5$, $TeO_2$, $GeO_2$, $Sb_2O_3$, $Bi_2O_3$ and $B_2O_3$ and/or at least one second additive selected from $MoO_3$ and $WO_3$. A molten mixture of the components is prepared and then quenched. In a preferred embodiment the quenching is accomplished by passage through a twin roll quenching apparatus. The amorphous $V_2O_5$ is used as an active cathode material for a lithium battery. Both cathode construction and lithium battery construction and performance is described.

Tobishima et al. (U.S. Pat. No. 4,737,424) describes a lithium secondary battery containing a cathode having an amorphous $V_2O_5$ active material. Substantially pure $V_2O_5$ or $V_2O_5$ mixed with $P_2O_5$, $TeO_2$, $GeO_2$, $Sb_2O_3$, $Bi_2O_3$, $GeO_2$, $B_2O_3$, $MoO_3$, $WO_3$ and $TiO_2$ is indicated as a useful cathode active material. The amorphous material is prepared by melting a mixture of the components and then quenching the melt. Lithium secondary batteries with a cathode containing the amorphous $V_2O_5$ are described.

Noguchi et al. (U.S. Pat. No. 5,273,848) describes a cathode active material containing an amorphous solid solution of $V_2O_5$, $P_2O_5$ and an alkaline earth metal oxide (MO) and optionally $CoO_2$. The amorphous material is prepared by rapidly quenching a melt of the components and in one embodiment the quench is conducted using twin copper rollers. Lithium batteries based on a cathode of the amorphous $V_2O_5$ mixture are described.

Kelley et al. (U.S. 2005/0079418) describes a method to prepare thin film batteries, including lithium, lithium ion and lithium free batteries. Materials described as useful as a cathode active material include amorphous $V_2O_5$. No actual working examples of batteries are provided and no description of a lithium free battery is provided.

Chen et al. (U.S. 2011/0070500) describes an electrode material prepared by combining an amorphous metal oxide and a crystalline metal oxide. The composite is then used in construction of an electrode. An example based on vanadium pentoxide is described as well as utility as a cathode for a lithium secondary battery.

Aoyagi et al. (U.S. 2012/0164537) describes a cathode material containing $V_2O_5$ crystallites within an amorphous phase of a combination of metal oxides. The amorphous phase metal oxide include vanadium, iron, manganese, silver, copper, cobalt, nickel, tungsten and boron. The crystallite/amorphous dual phase material is obtained by combining the metals as oxides and heating the mixture in an electric furnace to a temperature of approximately 900 to 1100° C. and then pouring the melt onto a stainless steel plate. A magnesium battery containing the dual phase material as a cathode active material is described.

Imamura et al. (Mg Intercalation Properties into $V_2O_5$ gel/Carbon Composites under High-Rate Condition; Journal of the Electrochemical Society, 150(6) A753-A758 (2003)) describes a $V_2O_5$ carbon composite material which when constructed into an electrode intercalates Mg ion. The composite is formed based on a $V_2O_5$ sol., i.e., a hydrated $V_2O_5$ crystal.

Miyayama et al. (Characterization of magnesium-intercalated $V_2O_5$/carbon composites; Solid State Ionics, 161 (2003) 173-180) describes $V_2O_5$/carbon composites and studies $Mg^{2+}$ reversible diffusion into the $V_2O_5$ xerogel structure. A structural model of the xerogel is described.

Amatucci et al. (Investigation of Yttrium and Polyvalent Ion Intercalation into Nanocrystalline Vanadium Oxide; Journal of the Electrochemical Society, 148 (8) A940-A950 (2001) describes studies showing that nanocrystalline $V_2O_5$ is capable of reversible intercalation of $Mg^{2+}$. This reference provides description of the utility of nanocrystalline $V_2O_5$ as a cathode active material for univalent and multivalent ions.

Doe et al. (WO 2011/150093) describes a series of compounds which are suitable as cathode materials for a Mg battery. In one embodiment a $V_2O_5$ structure is prepared by first synthesizing a compound $MgV_2O_5$ and then removing the Mg by an electrochemical method. The resulting material is described as having a different stacking of $V_2O_5$ layers from directly prepared $V_2O_5$. Utility of the thus prepared differently stacked $V_2O_5$ as a cathode active material for a Mg battery is proposed.

However, each of the various forms of $V_2O_5$ described above fail to meet all the requirements necessary to function as a positive electrode active material in a magnesium battery which would supply the energy demands of a commercial electric vehicle. Nanocrystalline materials are difficult to be loaded densely in the cathode, which means that the thickness of the nanocrystalline-based cathode should be much thicker than that of micron-sized ones. That is to say that the volumetric energy density for a total cell based on such materials would be decreased. Also, nanocrystalline materials will promote electrolyte decomposition due to the extremely high surface area associated with such structure.

In hydrated forms of $V_2O_5$, much water acts as a ligand in the structure. During magnesium insertion/extraction in a typical non-aqueous media, water is an undesired molecule because a non-conducting and resistive blocking layer due to releasing water is formed on the counter anode.

The predicted redox potentials of $VOPO_4$ and $V_2O_5$ observed at around 2.3-2.6 V by using ab-initio calculation are lower than other known technologies, where the potential was observed at around 3V. As a result, lower voltage decreases the energy density of the battery.

Therefore, an object of the present invention is to provide a $V_2O_5$ based cathode active material which meets the requirements of a high energy magnesium battery and overcomes the deficiencies of the $V_2O_5$ forms conventionally known.

Another object of the present invention is to provide a positive electrode based on the $V_2O_5$ based cathode material and a magnesium battery containing the positive electrode having significantly improved energy density and performance in comparison to known magnesium electrochemical devices.

SUMMARY OF THE INVENTION

These and other objects are addressed by the present invention, the first embodiment of which includes a cathode for a magnesium battery comprising a current collector; and an active material of formula (I):

$$[V_2O_5]_c[MgX_y]_d[M_aO_b]_e \quad (I)$$

wherein M is an element selected from the group consisting of P, B, Si, Ge and Mo, X is O, F, Cl, Br, or I, a is an integer of from 1 to 2, b is an integer of from 1 to 5, c is from 35 to 80 mol %, d is from 0 to 25 mol %, e is from 20 to 50 mol %, y is 1 when X is O, y is 2 when X is F, Cl, Br, or I, and the active material of formula (I) is a substantially amorphous material.

In a further embodiment of the described first embodiment, the cathode comprises as a component of the active material, a transition metal, a transition metal oxide or a combination thereof.

In a second embodiment, the present invention provides magnesium battery comprising: an anode; a cathode; and an electrolyte; wherein the cathode comprises: a current collector; and an active material of formula (I):

$$[V_2O_5]_c[MgX_y]_d[M_aO_b]_e \quad (I)$$

wherein M is an element selected from the group consisting of P, B, Si, Ge and Mo, X is O, F, Cl, Br, or I, a is an integer of from 1 to 2, b is an integer of from 1 to 5, c is from 35 to 80 mol %, d is from 0 to 25 mol %, e is from 20 to 50 mol %, y is 1 when X is O, y is 2 when X is F, Cl, Br, or I, and the active material of formula (I) is a substantially amorphous material.

In a further embodiment of the second embodiment the cathode active material of the magnesium battery comprises a transition metal, a transition metal oxide or a combination thereof.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DESCRIPTION OF THE PREFERRED EMBODIMENTS OF THE INVENTION

Figure 1:
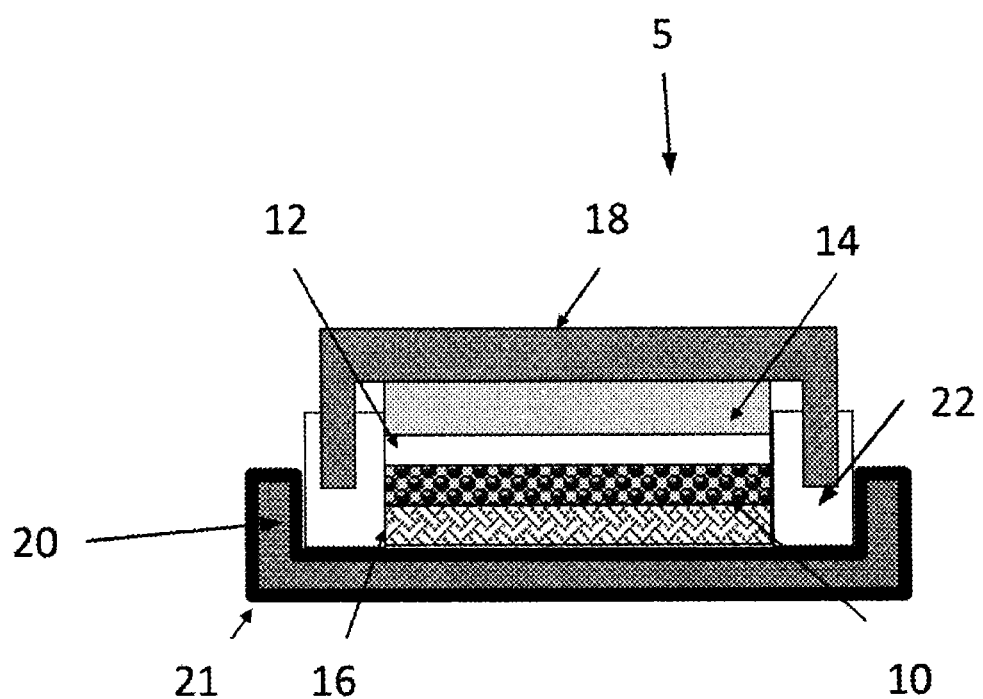
FIG. 1 is a schematic diagram of a magnesium battery according to one embodiment of the present invention.

The present inventors are conducting a wide scale study and evaluation of materials which may function as cathode active materials for a magnesium secondary battery. The object of this study is to discover cathode active materials which are readily available, safe and comparatively easy to handle in a production environment and which provide a magnesium battery having high capacity and high working potential.

Throughout this description all ranges described include all values and sub-ranges therein, unless otherwise specified. Additionally, the indefinite article "a" or "an" carries the meaning of "one or more" throughout the description, unless otherwise specified.

The inventors have surprisingly discovered that amorphous compositions of vanadium oxide are capable of magnesium insertion and extraction and that such material when formulated into a cathode allows for the production of a magnesium battery having high capacity and working potential.

Thus, in the first embodiment, the present invention provides a cathode for a magnesium battery comprising a current collector; and an active material of formula (I):

$$[V_2O_5]_c[MgX_y]_d[M_aO_b]_e \qquad (I)$$

wherein M is an element selected from the group consisting of P, B, Si, Ge and Mo, X is O, F, Cl, Br, or I, a is an integer of from 1 to 2, b is an integer of from 1 to 5, c is from 35 to 80 mol %, d is from 0 to 25 mol %, e is from 20 to 50 mol %, y is 1 when X is O, y is 2 when X is F, Cl, Br, or I, and the active material of formula (I) is a substantially amorphous material.

The inventors have surprisingly discovered that amorphous $V_2O_5$ materials can provide a cathode active material capable of a 3V class redox reaction. Without being constrained by theory, it is believed that the amorphous matrix provides many defects and distorted spaces for Mg ions. Also, V redox element functions by multiple redox reaction as described above.

Amorphorization of the $V_2O_5$ may be conducted employing quenching and ball milling methods which are conventionally known. Applicants have discovered that by adding glass forming agents containing at least one of $P_2O_5$, $B_2O_3$, $SiO_2$, $GeO_2$ and $MoO_3$ to the $V_2O_5$ during the preparation and by careful monitoring of the formation conditions, a substantially amorphous material may be obtained. Further as indicated by the results as reported in Table 1, the inventors have determined that addition of magnesium oxide or a magnesium halide in limited quantity may assist in the amorphization process. The actual conditions of time, temperature, composition content, quench method or milling media may vary depending on the agent added and the content of the components.

In addition, the relative mol % content of $V_2O_5$ in the material of formula (1) affects the performance of a magnesium cell containing the material as a cathode active ingredient. Thus as shown in Table 1 and the Figs. related to the Examples and Comparative Examples, when the mol % of $V_2O_5$ is in a range of about 35% to about 80%, significantly greater reversible redox activity may be obtained. However, as shown in Comparative Examples 1-5, when the $V_2O_5$ content is outside this range the redox activity is much less. As a guideline for the indication of reversible redox peak observed at 0.5 V in Table 1, an observation of at least two cycles of redox peaks with a current over 0.005 mA at 0.5 V, which is corresponding to one tenth lower current than the observed one, was required. Preferably, the content of $V_2O_5$ may be from 70 to 80 mol % and in a highly preferred embodiment, the $V_2O_5$ content may be 75 mol %. The inventors have determined however, that the actual most preferred content varies according to the actual components of composition of the material of formula (I). Such preferred embodiments may be determined by the methods outlined in the Examples or by other methods conventionally known to persons of ordinary skill in the art.

According to the present invention, the description "substantially amorphous" means that the material when analyzed by XRD does not show any crystalline peaks.

Thus in one embodiment commercially available $V_2O_5$ having a minimum purity of 98%, preferably, a minimum purity of 99% and most preferably, a minimum purity of 99.5% may be physically mixed with a glass forming agent and optionally, magnesium oxide or a magnesium halide in a selected mole % ratio. The physical mixture may then be co-comminuted in any conventional milling apparatus such as a ball mill until an XRD spectrum of the milled composite mixture is devoid of peaks associated with a crystalline material.

In another embodiment, the physical mixture of the $V_2O_5$, glass forming agent and optional magnesium oxide or magnesium halide is heated in an appropriate furnace or oven and quenched by dropping into water or by pressing between two plates or rollers. The amorphous solid solution obtained may then be pulverized. Although the grain size of the pulverlant material is not limited, in a preferred embodiment, the grain size is 10 µm or less, more preferably 5 µm or less and most preferably 1 µm or less.

To prepare the cathode the amorphous $[V_2O_5]_c[MgX_y]_d[M_aO_b]_e$ may be mixed with a binder. The binder material is not particularly limited and any binder recognized by one of skill in the art as suitable may be employed. Suitable binders may include polyvinylidene fluoride (PVDF), polytetrafluoroethylene (PTFE), styrene butadiene rubber (SBR), and polyimide. Polytetrafluoroethylene may be employed in one preferred embodiment.

In an embodiment of the invention the amorphous $[V_2O_5]_c[MgX_y]_d[M_aO_b]_e$ may be mixed with a carbonaceous material such as graphite, carbon nanotubes or carbon black.

The amount of binder and carbonaceous material in the cathode composition may be no greater than 50% by weight, preferably no greater than 30% by weight and more preferably, no greater than 10% by weight.

Figure 29:
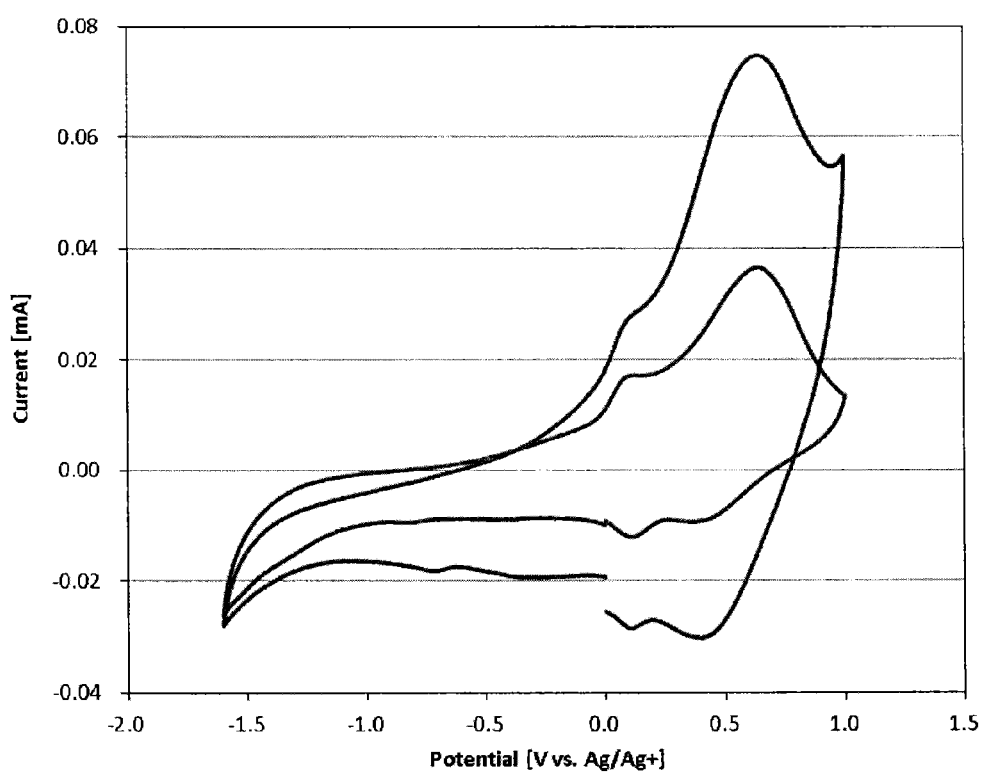
FIG. 29 shows cyclic voltammograms of Example 2 prepared in a stainless steel ball mill container compared to a zirconia ball mill container.

The inventors have further surprisingly discovered that when a metal dopant is included in the cathode active material higher current performance of a magnesium cell may be obtained. This effect is shown in FIG. 29 where significantly higher current performance is obtained with a sample milled in a stainless steel container in comparison to a zirconia container.

Applicants believe the higher performing material may be contaminated or doped with a transition metal during the milling process and without being constrained by theory, the inventors believe the transition metal may act as a redox catalyst and/or may enhance the amorphousization process. Even though the content of the dopant may be below the detection limit of surface sensitive XPS analysis, the enhanced redox activity of the doped active material may be observed.

Regardless, a further embodiment of the present invention includes a cathode for a magnesium battery comprising a current collector; and an active material of formula (I):

$$[V_2O_5]_c[MgX_y]_d[M_aO_b]_e \quad (I)$$

wherein M is an element selected from the group consisting of P, B, Si, Ge and Mo, X is O, F, Cl, Br, or I, a is an integer of from 1 to 2, b is an integer of from 1 to 5, c is from 35 to 80 mol %, d is from 0 to 25 mol %, e is from 20 to 50 mol %, y is 1 when X is O, y is 2 when X is F, Cl, Br, or I, the active material of formula (I) is a substantially amorphous material and wherein the cathode active material comprises a transition metal, a transition metal oxide or a combination thereof.

The transition metal may be at least one selected from the group consisting of Fe, Ti, Co, Ni, Mn, Zr W, Ru, Rh, Pd, Ag, Pt and Au. In one preferred embodiment the dopant may be Fe or an oxide of Fe.

The anode of the magnesium battery may be any anode suitable for a magnesium battery, including an anode of magnesium metal or a composition containing magnesium metal, such as $Mg_3Bi_2$. The anode active material may further include an electrically conductive material and a binder. Examples of electrically conducting materials include carbon particles, such as carbon black. Example binders include various polymers, such as PVDF, PTFE, SBR, and polyimide.

An electrolyte layer is disposed between the anode and cathode and may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt. In one aspect, the electrolyte may include phenyl magnesium chloride (Ph-$MgCl^+$) aluminum trichloride ($AlCl_3^-$) in tetrahydrofuran (THF) or magnesium bis(trifluoromethanesulfonyl)imide [$Mg(TFSI)_2$] in acetonitrile (ACN). In a preferred embodiment, the electrolyte may be $Mg(TFSI)_2$ in ACN.

The cathode active material may be present as a sheet, ribbon, particles, or other physical form. An electrode containing the cathode active material may be supported by a current collector.

A current collector may include a metal or other electrically conducting sheet on which the electrode is supported. The current collector may be formed of carbon, carbon paper, carbon cloth or a metal or noble metal mesh or foil.

FIG. 1 shows an example of one configuration of a rechargeable magnesium cell 5. The cell 5 includes a positive electrode 10 including the amorphous $V_2O_5$—$M_xO_y$ material according to the invention as the cathode active material, an electrolyte layer 12, a negative electrode 14, a cathode current collector 16, a negative electrode housing 18, a positive electrode housing 20 including an inert layer 21, and a sealing gasket 22. The electrolyte layer 16 may include a separator soaked in electrolyte solution, and the positive electrode 10 may be supported by the cathode current collector 16. In this example, the negative electrode 14 includes an active material of magnesium metal.

Figure 2:
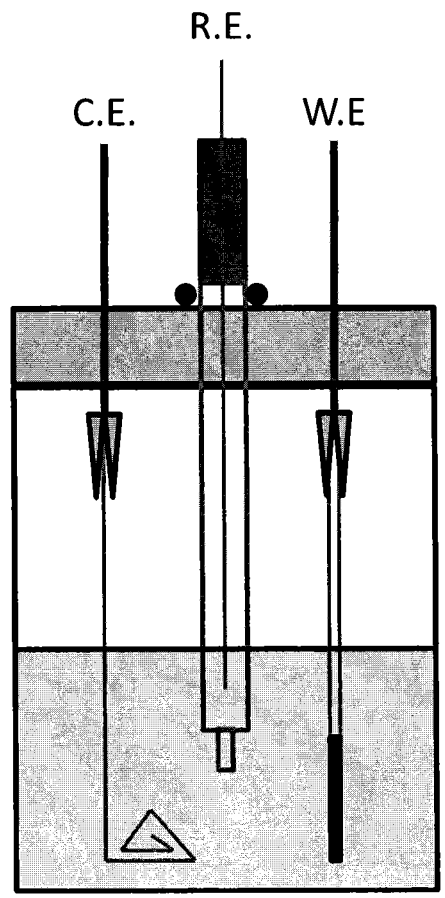
FIG. 2 is a schematic diagram of a three electrode magnesium cell for fundamental evaluation of electrode active materials according to the present invention.

FIG. 2 shows a schematic diagram of a three electrode cell which may be useful for evaluation and characterization of the cathode active materials of the present invention. In FIG. 2. The cell may be constructed with a glass vial having a silicone cap. The reference electrode (R.E.) is a $Ag/Ag^+$ electrode consisting of a Ag wire in a reference solution of 0.01 M $AgNO_3$ and 0.1 M tetrabutylammonium phosphate (TBAP) in acetonitrile (ACN). The working electrode (W.E.) is constructed of an 80 mesh stainless steel screen upon which a layer of the active material to be tested is formed. The anode (C.E.) is constructed of a magnesium foil. The electrolyte is a 1 M $Mg(TFSI)_2$ in ACN. A test cell as shown schematically in FIG. 2 may be useful to conduct cyclic voltammetry, impedance and charge/discharge testing. Such testing may be conducted in an argon atmosphere by placing the test cell in a glove box.

Having generally described this invention, a further understanding can be obtained by reference to certain specific examples which are provided herein for purposes of illustration only and are not intended to be limiting unless otherwise specified.

EXAMPLES

Test materials as listed in Table 1, except for comparative examples 1, 6 and 7 were prepared by ball milling (where indicated) of the starting materials under a rotation speed of 370 rpm for 20 h in Ar atmosphere. The balls and pot used for ball milling synthesis were constructed of ZrO2. After ball milling, the samples were collected under an argon atmosphere.

| No. | Sample composition | XRD pattern | Reversible redox peak observed at 0.5 V |
|---|---|---|---|
| Example 1 | $V_2O_5/P_2O_5$ = 80/20 | Amorphous | Yes |
| Example 2 | $V_2O_5/P_2O_5$ = 75/25 | Amorphous | Yes |
| Example 3 | $V_2O_5/P_2O_5$ = 67/33 | Amorphous | Yes |

-continued

| No. | Sample composition | XRD pattern | Reversible redox peak observed at 0.5 V |
|---|---|---|---|
| Example 4 | $V_2O_5/P_2O_5 = 60/40$ | Amorphous | Yes |
| Example 5 | $V_2O_5/P_2O_5 = 50/50$ | Amorphous | Yes |
| Example 6 | $MgO/V_2O_5/P_2O_5 = 12.5/56.25/31.25$ | Amorphous | Yes |
| Example 7 | $MgO/V_2O_5/P_2O_5 = 25/37.5/37.5$ | Amorphous | Yes |
| Example 8 | $MgCl_2/V_2O_5/P_2O_5 = 12.5/56.25/31.25$ | Amorphous | Yes |
| Example 9 | $MgBr_2/V_2O_5/P_2O_5 = 12.5/56.25/31.25$ | Amorphous | Yes |
| Example 10 | $MgI_2/V_2O_5/P_2O_5 = 12.5/56.25/31.25$ | Amorphous | Yes |
| Comparative example 1 | As-prepared $V_2O_5$ (No ball mill) | Crystal | No |
| Comparative example 2 | $V_2O_5/P_2O_5 = 100/0$ | Crystal | No |
| Comparative example 3 | $V_2O_5/P_2O_5 = 90/10$ | Amorphous | No |
| Comparative example 4 | $V_2O_5/P_2O_5 = 85/15$ | Amorphous | No |
| Comparative example 5 | $V_2O_5/P_2O_5 = 33/67$ | Amorphous | No |
| Comparative example 6 | Blank ($SiO_2$) | Crystal | No |
| Comparative example 7 | Blank (No cathode material) | — | No |
| Comparative example 8 | $V_2O_5/P_2O_5 = 75/25$ calcined at 319° C. | Crystal | No |
| Comparative example 9 | $V_2O_5/P_2O_5 = 75/25$ calcined at 450° C. | Crystal | No |
| Comparative example 10 | $MgO/V_2O_5/P_2O_5 = 37.5/18.75/43.75$ | Amorphous | No |
| Comparative example 11 | $MgCl_2/V_2O_5/P_2O_5 = 25/37.5/37.5$ | Amorphous | No |
| Comparative example 12 | $MgBr_2/V_2O_5/P_2O_5 = 25/37.5/37.5$ | Amorphous | No |
| Comparative example 13 | $MgI_2/V_2O_5/P_2O_5 = 25/37.5/37.5$ | Amorphous | No |
| Comparative example 14 | $BaO/V_2O_5/P_2O_5 = 12.5/56.25/31.25$ | Amorphous | No |

Figure 3:
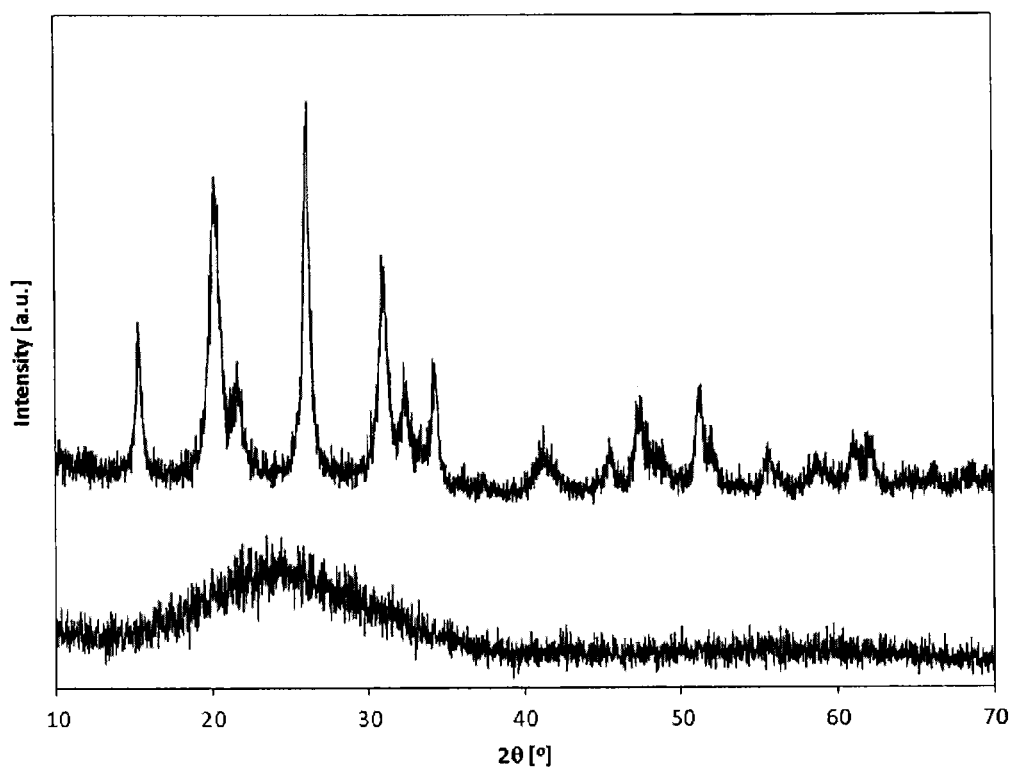
FIG. 3 shows XRD spectra of Example 2 and Comparative Example 2 of Table 1.
Figure 4:
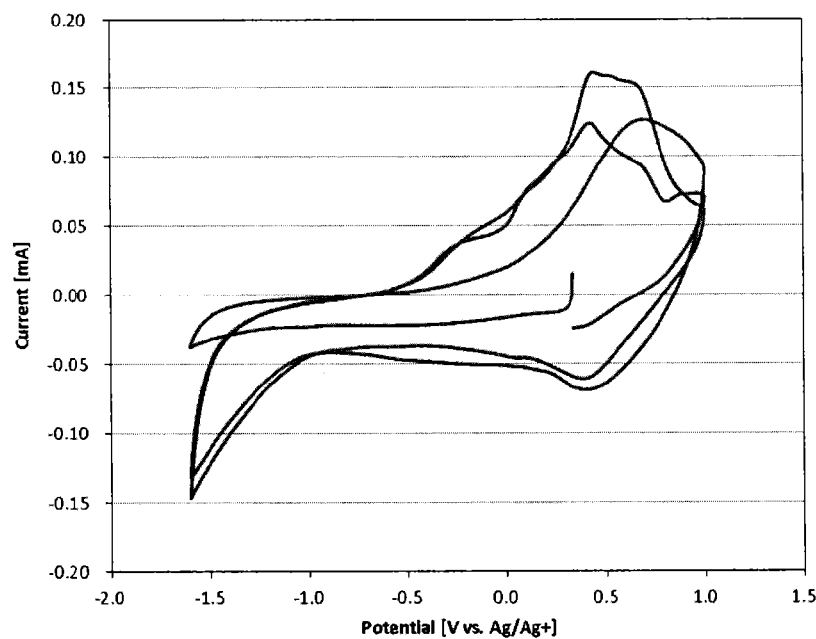
FIG. 4 shows a cyclic voltammogram of Example 1 of Table 1.
Figure 5:
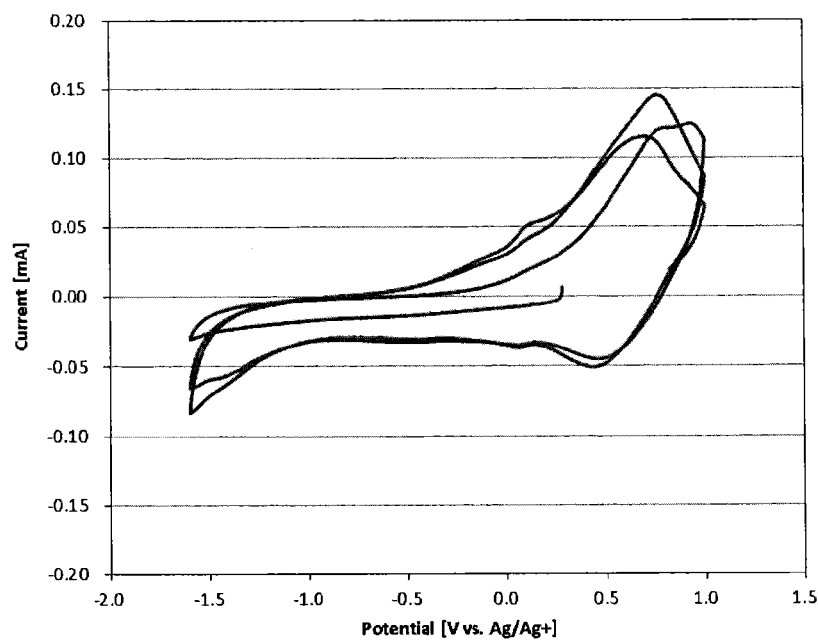
FIG. 5 shows a cyclic voltammogram of Example 2 of Table 1.
Figure 6:
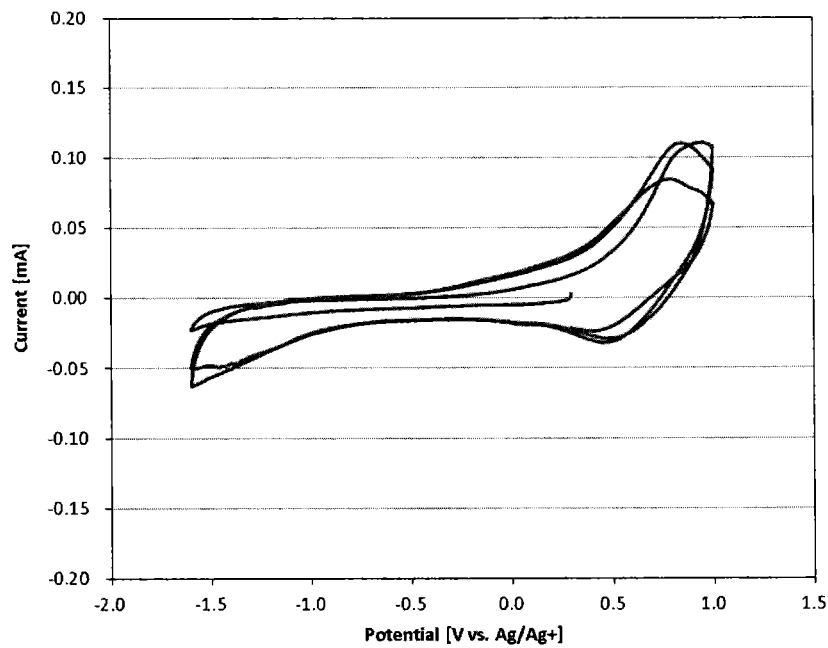
FIG. 6 shows a cyclic voltammogram of Example 3 of Table 1.
Figure 7:
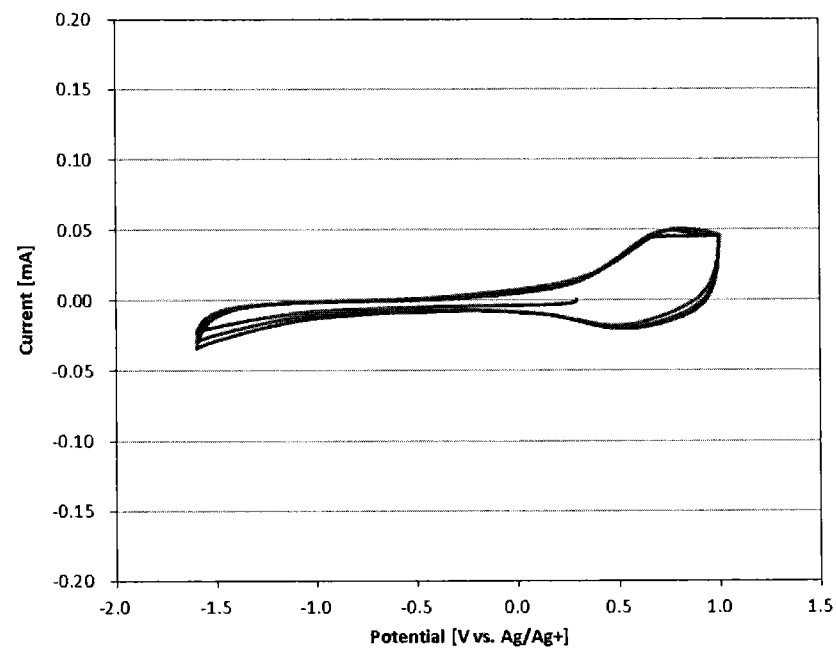
FIG. 7 shows a cyclic voltammogram of Example 4 of Table 1.
Figure 8:
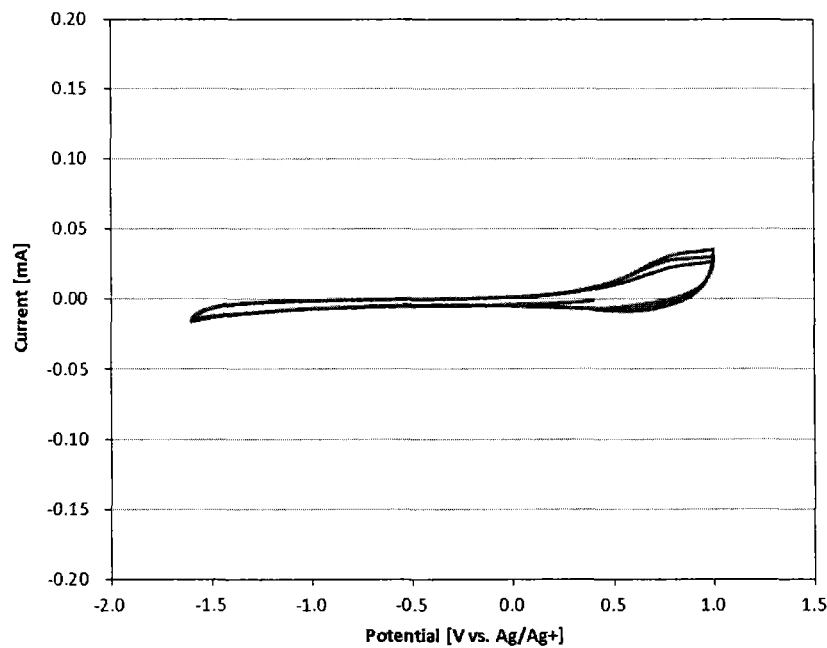
FIG. 8 shows a cyclic voltammogram of Example 5 of Table 1.
Figure 9:
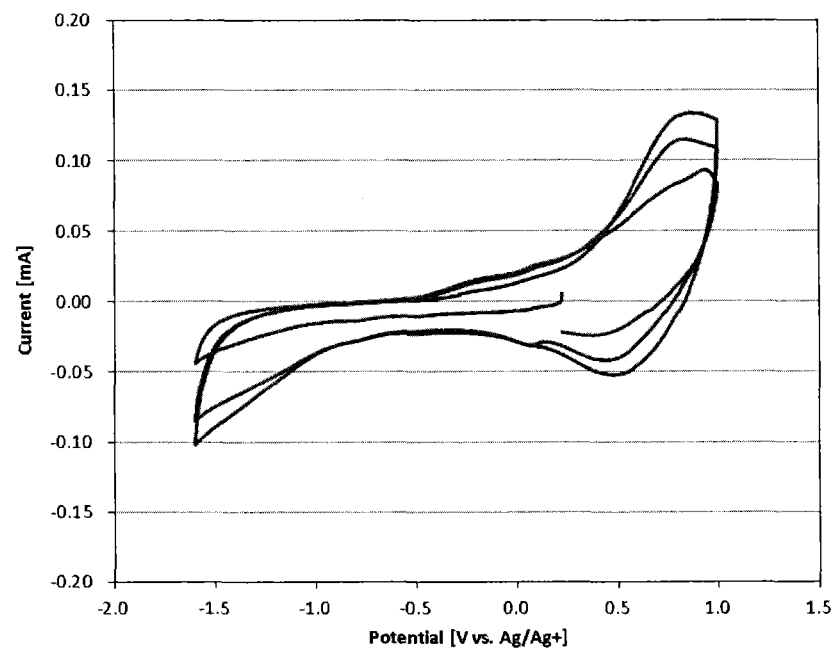
FIG. 9 shows a cyclic voltammogram of Example 6 of Table 1.
Figure 10:
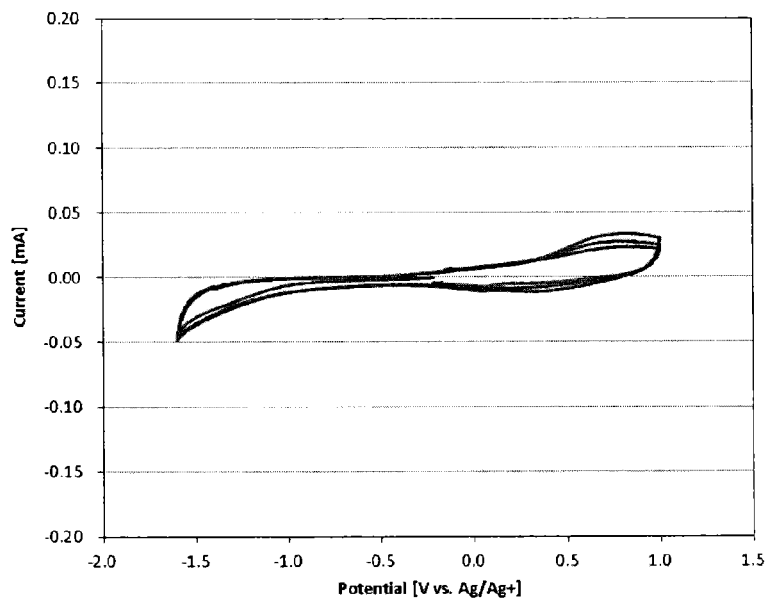
FIG. 10 shows a cyclic voltammogram of Example 7 of Table 1.
Figure 11:
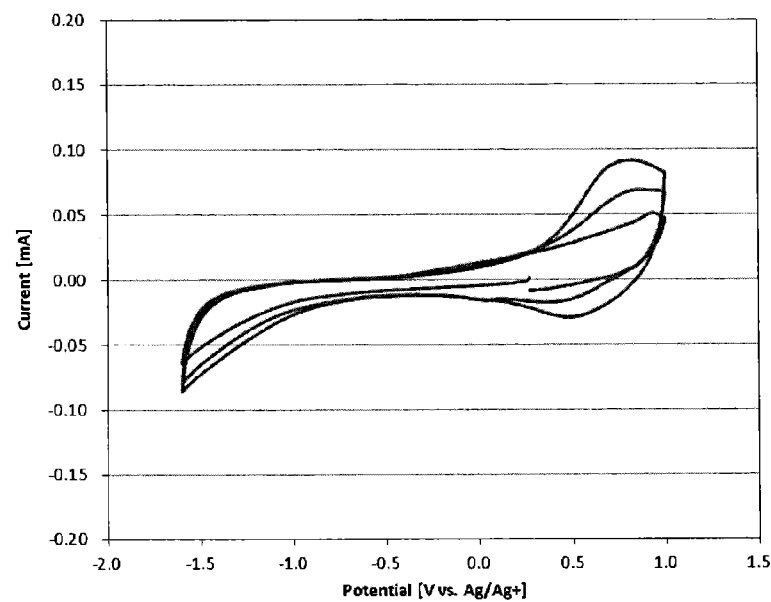
FIG. 11 shows a cyclic voltammogram of Example 8 of Table 1.
Figure 12:
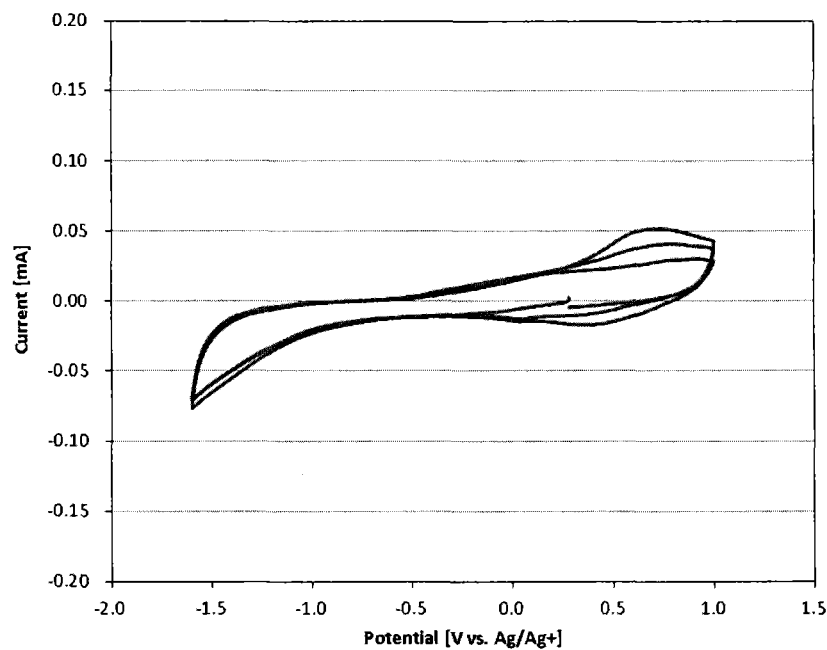
FIG. 12 shows a cyclic voltammogram of Example 9 of Table 1.
Figure 13:
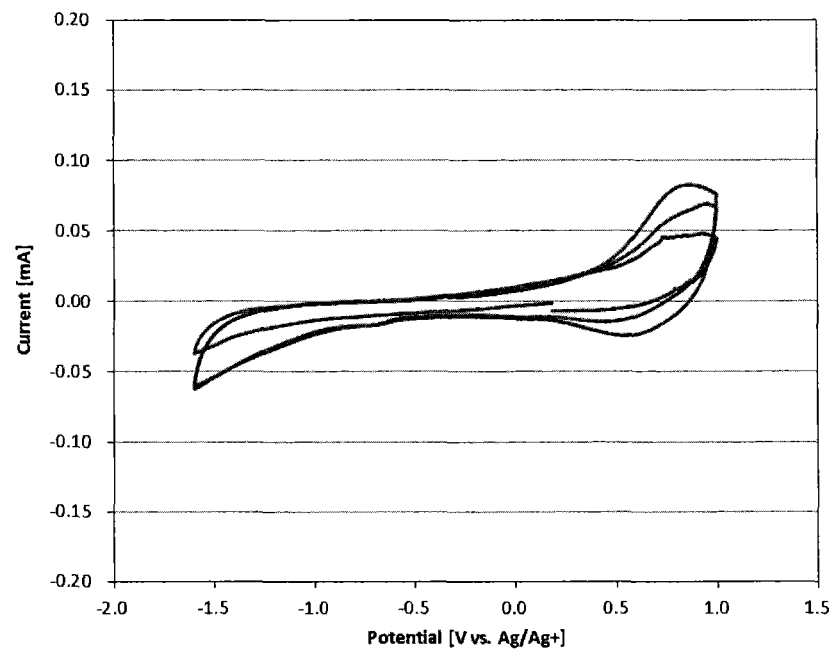
FIG. 13 shows a cyclic voltammogram of Example 10 of Table 1.
Figure 14:
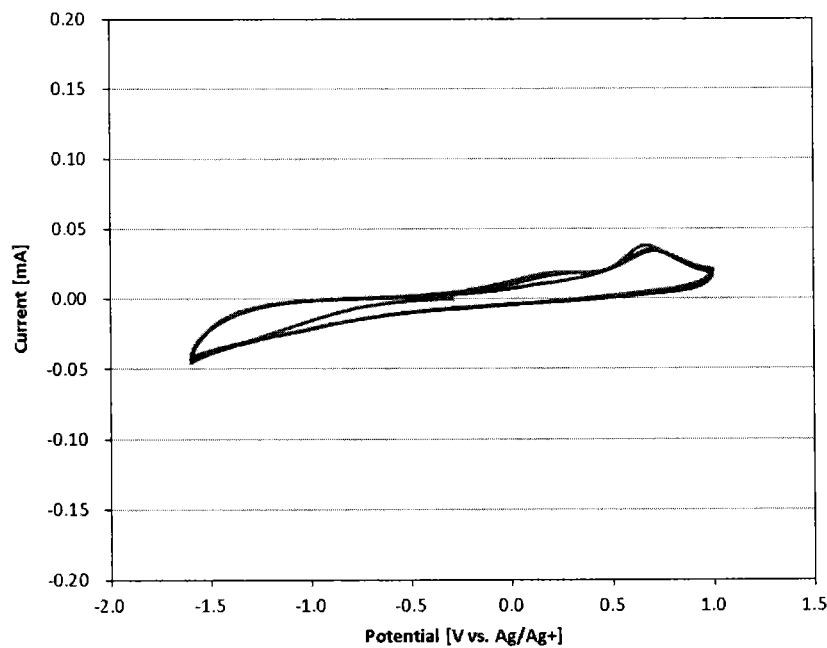
FIG. 14 shows a cyclic voltammogram of Comparative Example 1 of Table 1.
Figure 15:
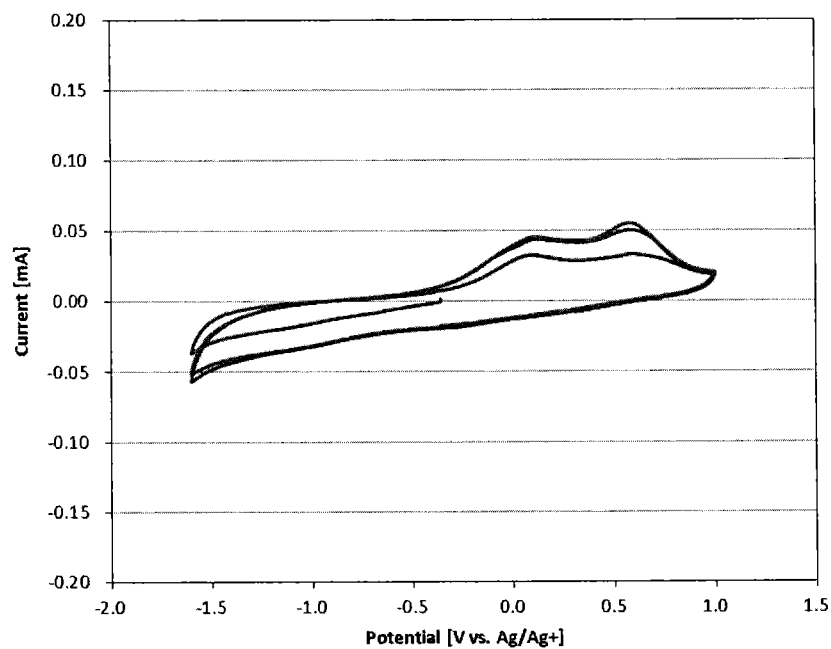
FIG. 15 shows a cyclic voltammogram of Comparative Example 2 of Table 1.
Figure 16:
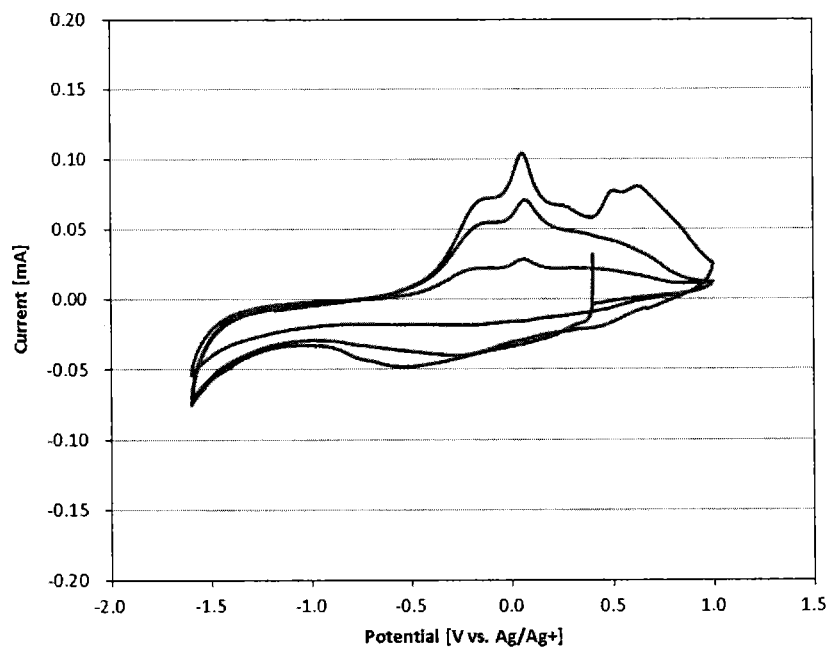
FIG. 16 shows a cyclic voltammogram of Comparative Example 3 of Table 1.
Figure 17:
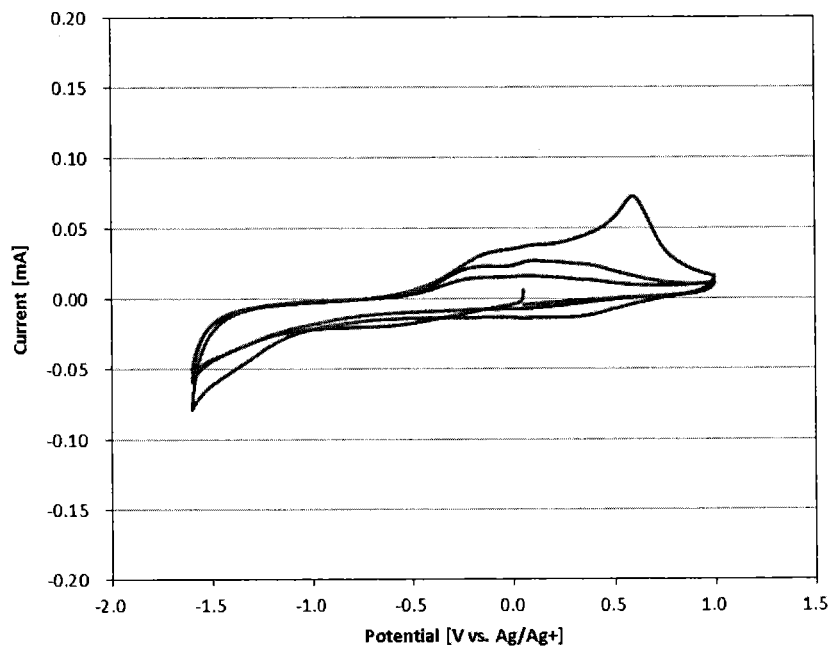
FIG. 17 shows a cyclic voltammogram of Comparative Example 4 of Table 1.
Figure 18:
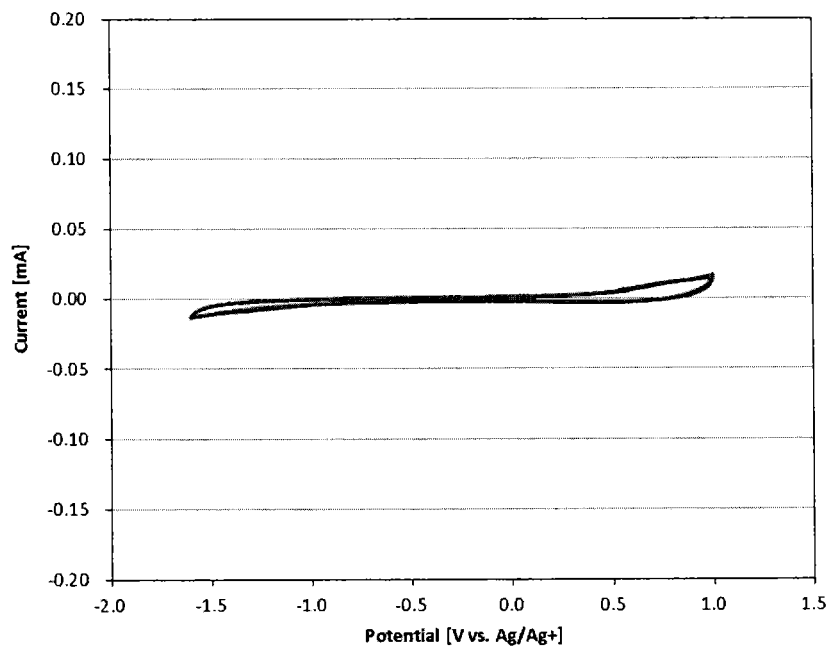
FIG. 18 shows a cyclic voltammogram of Comparative Example 5 of Table 1.
Figure 19:
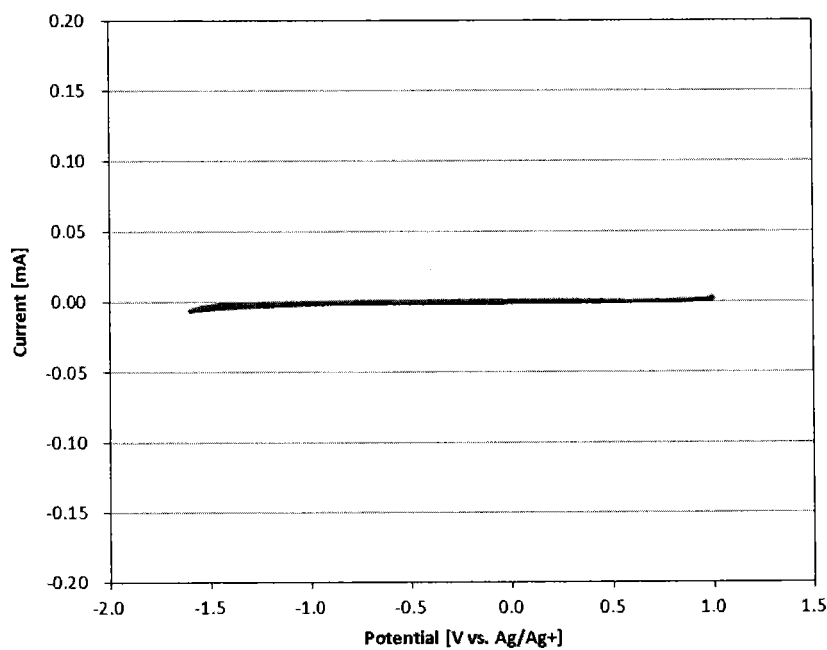
FIG. 19 shows a cyclic voltammogram of Comparative Example 6 of Table 1.
Figure 20:
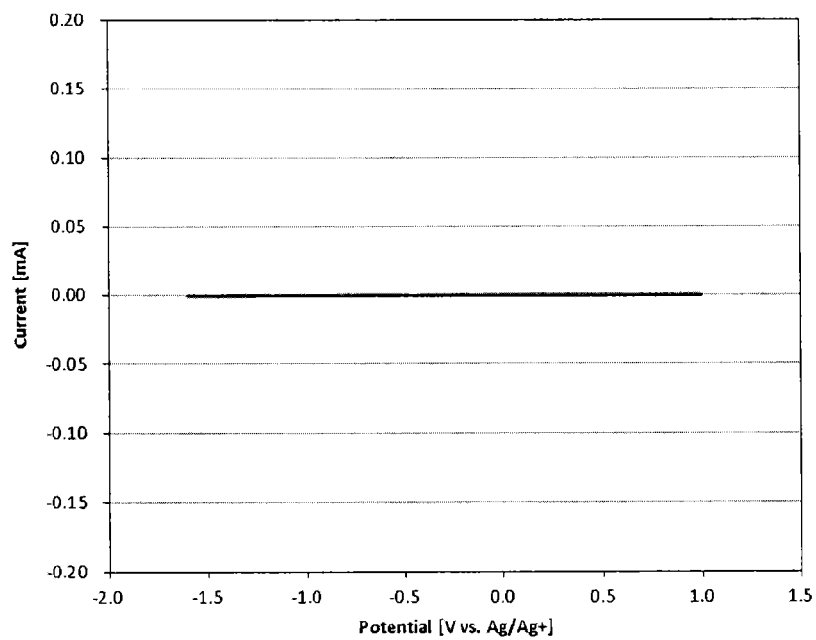
FIG. 20 shows a cyclic voltammogram of Comparative Example 7 of Table 1.
Figure 21:
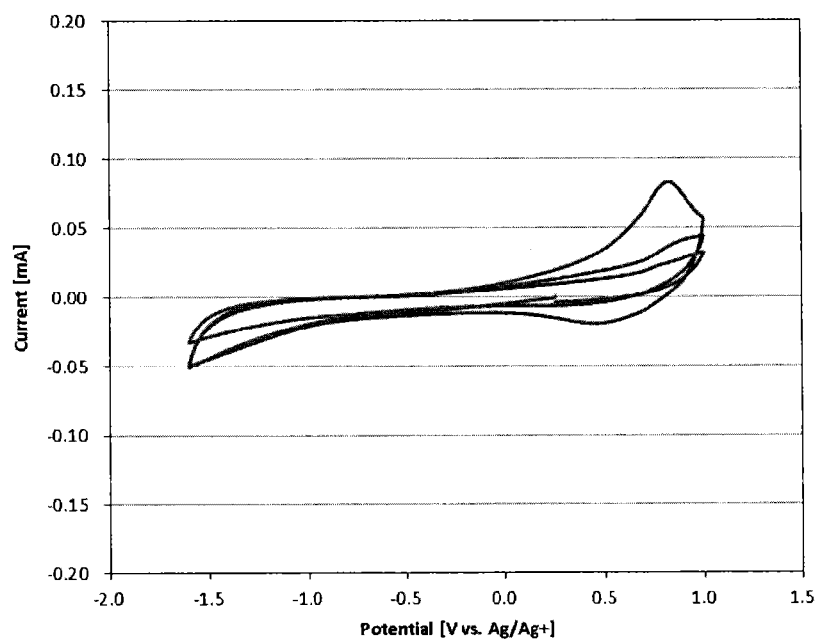
FIG. 21 shows a cyclic voltammogram of Comparative Example 8 of Table 1.
Figure 22:
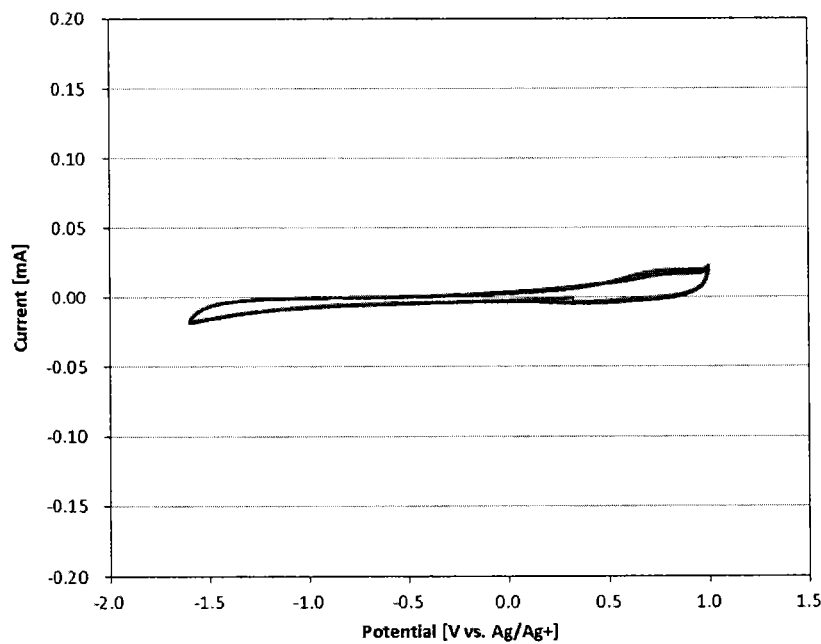
FIG. 22 shows a cyclic voltammogram of Comparative Example 9 of Table 1.
Figure 23:
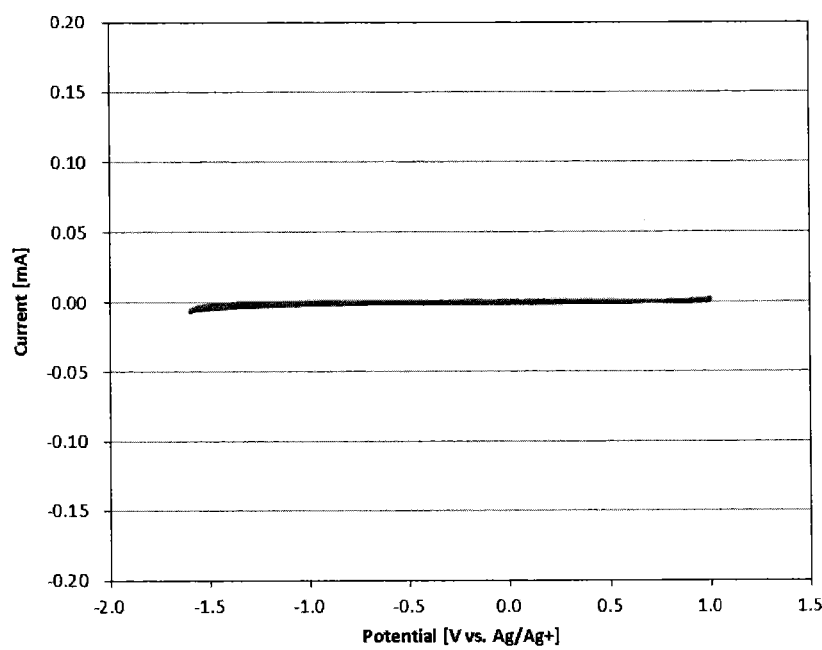
FIG. 23 shows a cyclic voltammogram of Comparative Example 10 of Table 1.
Figure 24:
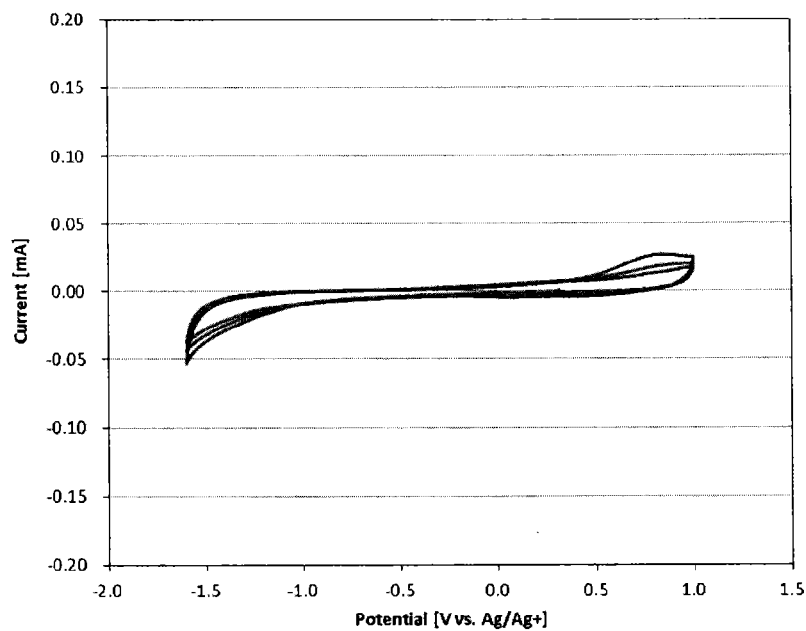
FIG. 24 shows a cyclic voltammogram of Comparative Example 11 of Table 1.
Figure 25:
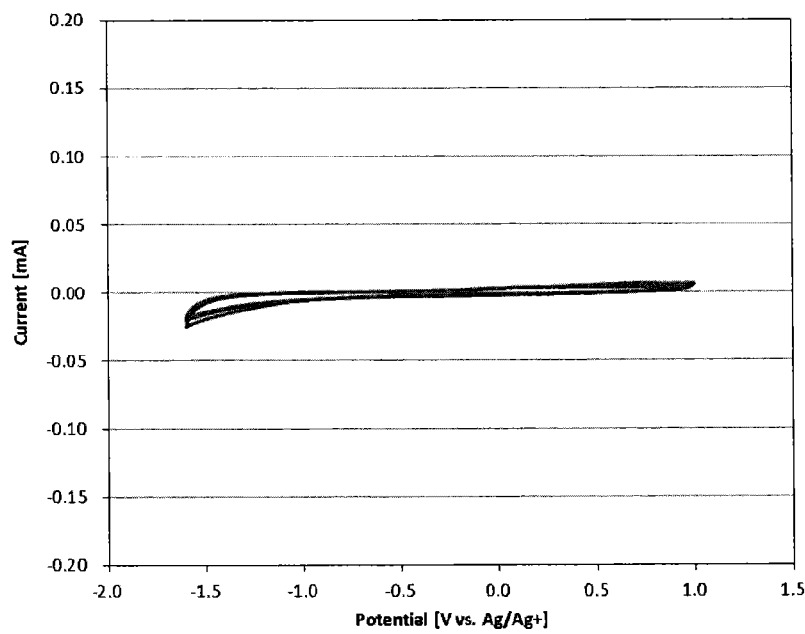
FIG. 25 shows a cyclic voltammogram of Comparative Example 12 of Table 1.
Figure 26:
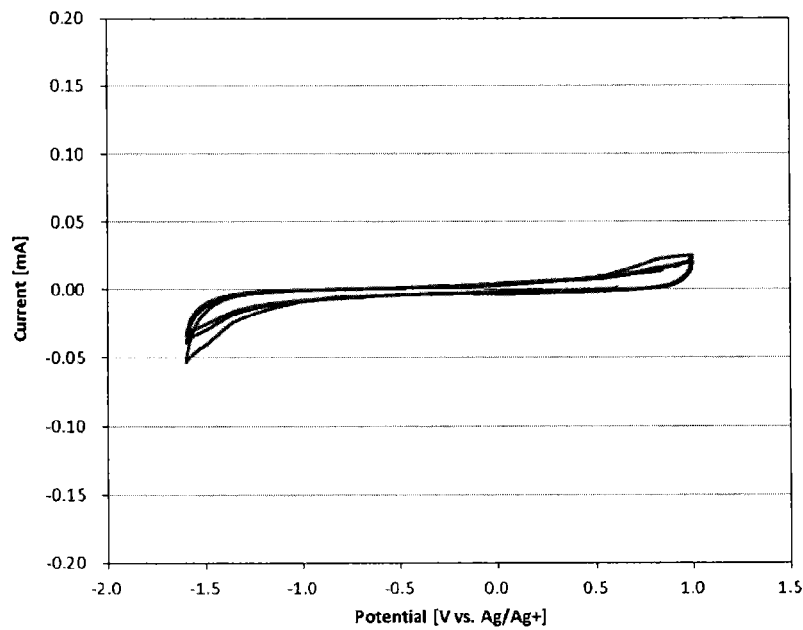
FIG. 26 shows a cyclic voltammogram of Comparative Example 13 of Table 1.
Figure 27:
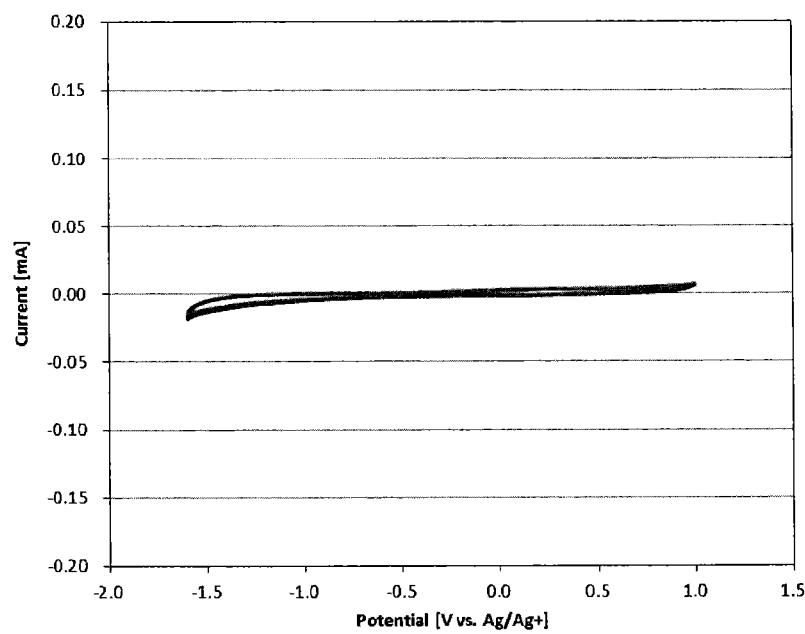
FIG. 27 shows a cyclic voltammogram of Comparative Example 14 of Table 1.

FIG. 3 shows the XRD patterns of Example 2 and Comparative example 2.

Cyclic voltammograms of Examples 1-10 and Comparative examples 1-14 were obtained by using Ag reference electrode. In each case the working electrode was composed of the prepared active material according to Table 1, acetylene black and PVDF binder with a weight ratio of 50:25:25 on stainless steel mesh. Mg metal was used as counter electrode, and then either $Mg(TFSI)_2$ or $Mg(ClO_4)_2$ was used as a salt of Mg electrolyte coupled with battery grade acetonitrile solution. The Ag reference solution consisted of 0.1M $AgNO_3$ and 0.01M TBAP as supporting salt in acetonitrile solution. The scanning rate was 0.1 mV/sec and the operating temperature was 25° C. under Ar atmosphere. The Cyclic voltammograms of Examples 1-10, according to the invention are shown in FIGS. 4 to 13, respectively. The Cyclic voltammograms of Comparative Examples 1-14, not according to the invention are shown in FIGS. 14 to 27, respectively. The potential of 0 V obtained by the Ag reference electrode was corrected by a common redox couple of ferrocene and was offset to be 3.2 V vs. Li and 2.5 V vs. Mg.

Figure 28:
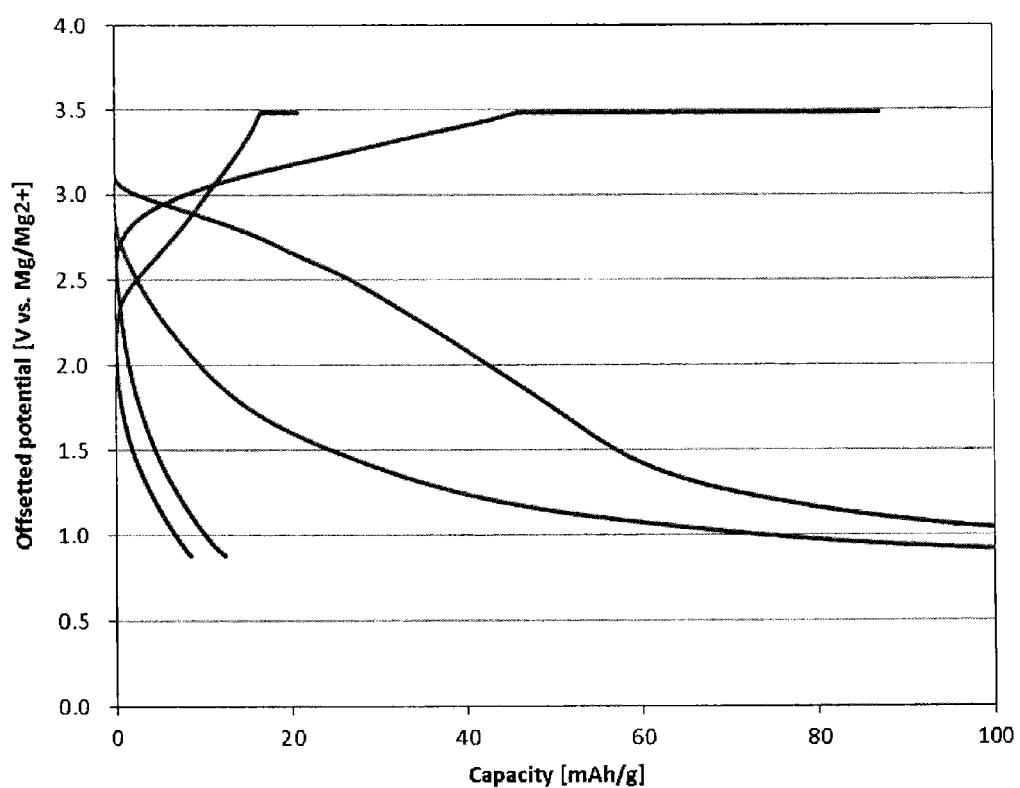
FIG. 28 shows Charge-discharge curves of cells constructed with the materials of Example 2 and Comparative example 2 of Table 1.

In addition, charge-discharge curves of cells constructed with the materials of Example 2 and Comparative example 2 are shown in FIG. 28. The cell configuration is the same as that of FIG. 2. The first discharge ran at constant current (CC) mode with a current of 100 μA. Next recharge ran at constant current and constant voltage (CC-CV) mode with 100 μA up to the offset potential of 3.5V vs. Mg and the cut-off current of 5 μA. The second discharge was run at CC mode with 10 μA.

Two samples of amorphous $V_2O_5$—$P_2O_5$ (mol ratio 3:1) were prepared by (a) ball milling the $V_2O_5$—$P_2O_5$ in a milling unit constructed (a) of stainless steel and (b) of $ZrO_2$. The milling beads in both cases were $ZrO_2$.

Test cells were fabricated and tested as described above. Cyclic voltammograms of both cells are shown in FIG. 29 where the curve of higher current performance is due to the sample milled in the stainless steel pot.

Numerous modifications and variations on the present invention are possible in light of the above description and examples. It is therefore to be understood that within the scope of the following Claims, the invention may be practiced otherwise than as specifically described herein. Any such embodiments are intended to be within the scope of the present invention.

The invention claimed is:

1. A cathode for a magnesium battery comprising:
   a current collector; and
   an active material of formula (I):

$$[V_2O_5]_c[MgX_y]_d[M_aO_b]_e \quad (I)$$

wherein
   M is an element selected from the group consisting of P, B, Si, Ge and Mo,
   X is O, F, Cl, Br, or I,
   a is an integer of from 1 to 2,
   b is an integer of from 1 to 5,
   c is from 35 to 80 mol %,
   d is from greater than 0 to 25 mol %,
   e is from 20 to 50 mol %,
   y is 1 when X is O,
   y is 2 when X is F, Cl, Br, or I, and
   the active material of formula (I) is a substantially amorphous material such that when analyzed by XRD the active material does not show any crystalline peaks.

2. The cathode according to claim 1, wherein c is from 50 to 80 mol %.

3. The cathode according to claim 1, wherein c is from 70 to 80 mol %.

4. The cathode according to claim 1, wherein c is 75 mol %.

5. The cathode according to claim 1, wherein $M_aO_b$ is at least one material selected from the group consisting of $P_2O_5$, $B_2O_3$, $SiO_2$, $GeO_2$ and $MoO_3$.

6. The cathode according to claim 1, wherein $M_aO_b$ is $P_2O_5$.

7. The cathode according to claim 1, wherein d is from greater than 0 to 15 mol %.

8. The cathode according to claim 1, further comprising as a component of the active material, a transition metal, a transition metal oxide or a combination thereof.

9. The cathode according to claim 8, wherein the transition metal or the transition metal of the oxide is at least one selected from the group consisting of Fe, Ti, Co, Ni, Mn, Zr, W, Ru, Rh, Pd, Ag, Pt and Au.

10. The cathode according to claim 9, wherein the transition metal or the transition metal of the oxide comprises iron.

11. A magnesium battery comprising:
an anode;
a cathode; and
an electrolyte;
wherein the cathode comprises:
   a current collector; and
   an active material of formula (I):

$$[V_2O_5]_c[MgX_y]_d[M_aO_b]_e \quad (I)$$

wherein
M is an element selected from the group consisting of P, B, Si, Ge and Mo,
X is O, F, Cl, Br, or I,
a is an integer of from 1 to 2,
b is an integer of from 1 to 5,
c is from 35 to 80 mol %,
d is from greater than 0 to 25 mol %;
e is from 20 to 50 mol %,
y is 1 when X is O,
y is 2 when X is F, Cl, Br, or I, and
the active material of formula (I) is a substantially amorphous material such that when analyzed by XRD the active material does not show any crystalline peaks.

12. The magnesium battery according to claim 11, wherein c is from 50 to 80 mol %.

13. The magnesium battery according to claim 11, wherein c is from 70 to 80 mol %.

14. The magnesium battery according to claim 11, wherein c is 75 mol %.

15. The magnesium battery according to claim 11, wherein d is from greater than 0 to 15 mol %.

16. The magnesium battery according to claim 11, wherein $M_aO_b$ is at least one material selected from the group consisting of $P_2O_5$, $B_2O_3$, $SiO_2$, $GeO_2$ and $MoO_3$.

17. The magnesium battery according to claim 16 wherein $M_aO_b$ is $P_2O_5$.

18. The magnesium battery according to claim 11, wherein the cathode active material further comprises a transition metal, a transition metal oxide or a combination thereof.

19. The magnesium battery according to claim 18, wherein the transition metal or the transition metal of the oxide is at least one selected from the group consisting of Fe, Ti, Co, Ni, Mn, Zr, W, Ru, Rh, Pd, Ag, Pt and Au.

20. The magnesium battery according to claim 19, wherein the transition metal or the transition metal of the oxide comprises iron.

* * * * *